United States Patent [19]

Woodbridge et al.

[11] Patent Number: 5,018,898
[45] Date of Patent: May 28, 1991

[54] PREVENTING MOVEMENT OF AN ARTICLE ALONG A SHAFT

[75] Inventors: Keith W. Woodbridge, Luton; Daniel J. Doncaster, London; Ronald F. Hamblin, Luton, all of United Kingdom

[73] Assignee: SKF (UK) Limited, Luton, United Kingdom

[21] Appl. No.: 445,427

[22] Filed: Dec. 4, 1989

[30] Foreign Application Priority Data

Dec. 5, 1988 [GB] United Kingdom ............... 8828581

[51] Int. Cl.⁵ .............................................. F16B 2/02
[52] U.S. Cl. ..................................... 403/11; 403/259; 403/261; 384/538
[58] Field of Search ............ 403/259, 261, 367, 368, 403/351, 350, 104, 11, 12, 345; 384/538

[56] References Cited

U.S. PATENT DOCUMENTS

| | | | |
|---|---|---|---|
| 2,650,141 | 8/1953 | Cooper | 403/351 X |
| 2,872,774 | 2/1959 | Fink | 403/259 X |
| 3,214,204 | 10/1965 | Carter | 403/11 |
| 3,380,766 | 4/1968 | Meibuhr | 403/261 X |
| 3,384,393 | 5/1968 | Horton et al. | 403/261 X |
| 3,413,022 | 11/1968 | Waddell | 403/261 |
| 3,606,406 | 9/1971 | Walters | 403/261 X |
| 3,804,562 | 4/1974 | Hansson | 403/259 X |
| 4,486,116 | 12/1984 | Sassi | 403/367 |
| 4,887,919 | 12/1989 | Hamblin | 403/345 X |

FOREIGN PATENT DOCUMENTS

| | | | |
|---|---|---|---|
| 304357 | 6/1971 | U.S.S.R. | 403/259 |
| 2169376 | 7/1986 | United Kingdom . | |
| 2203222 | 10/1988 | United Kingdom . | |

Primary Examiner—Peter M. Cuomo
Attorney, Agent, or Firm—Eguene E. Renz, Jr.

[57] ABSTRACT

For an assembly comprising a shaft (106) and an article (104) mounted on the shaft, a device (116) mounted on the shaft prevents movement of the article (104) along the shaft towards the device. The device preferably comprises a ring (116).

To protect the ring from accidental blows which may dislodge it, the assembly includes a cap (120).

To simplify manufacture of the ring, the projections of "noses" (118) are provided separately, preferably as part of the cap.

14 Claims, 6 Drawing Sheets

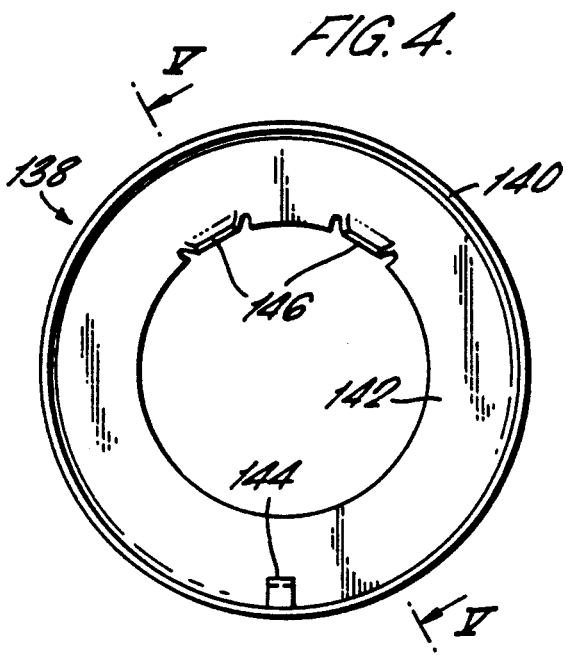
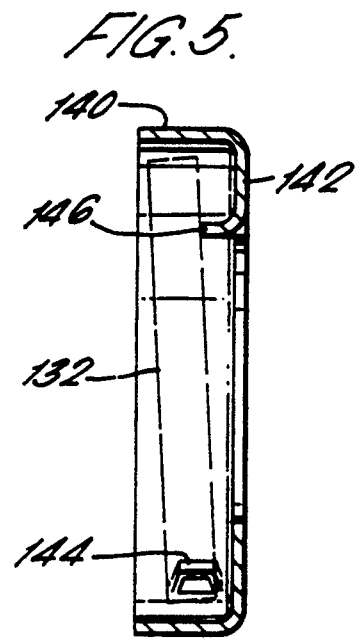
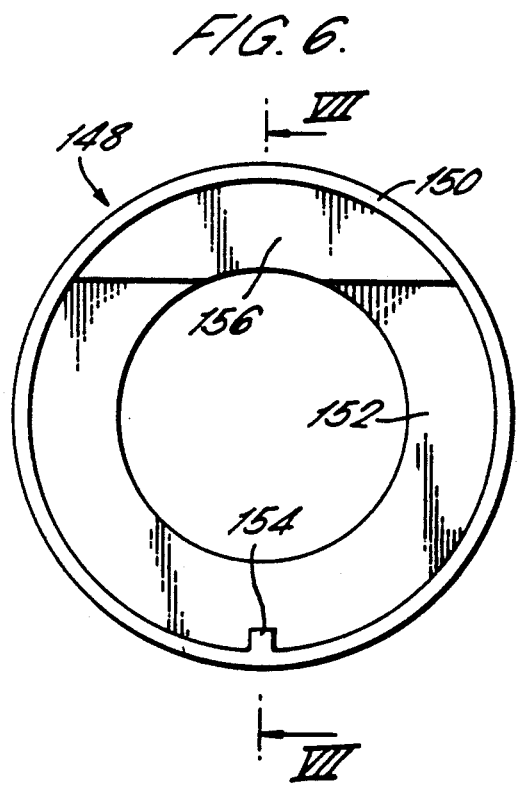
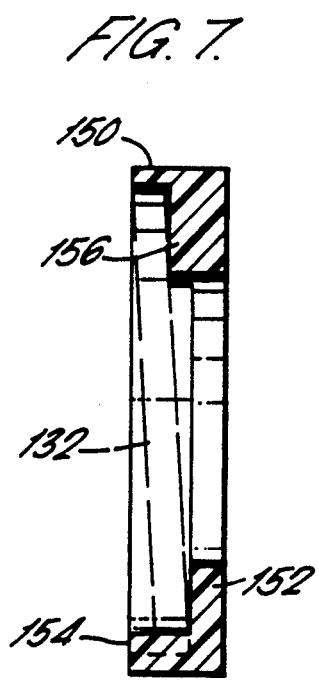
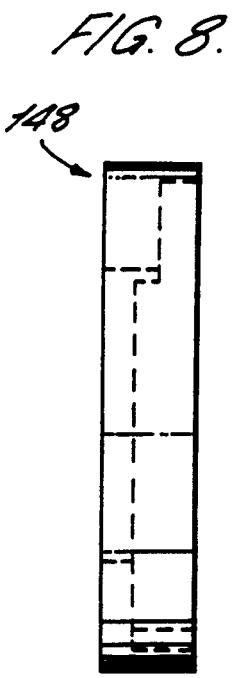

PREVENTING MOVEMENT OF AN ARTICLE ALONG A SHAFT

This invention concerns an assembly comprising a shaft, an article which is mounted on the shaft and a device which is also mounted on the shaft and prevents movement of the article along the shaft in the direction from the article to the device, the device comprising an element extending at least part the way round the shaft and which, during assembly, can be moved along the shaft and then caused to adopt a position in which it lies in a first plane extending perpendicular to a second plane in which lies the longitudinal axis of the shaft, the first plane forming an angle with a third plane extending perpendicular to the longitudinal axis of the shaft which is no greater than $\tan^{-1} \mu$, where $\mu$ is the coefficient of friction between the shaft and the element.

Such an assembly is the subject of GB-A-2169 376 and GB-A-2203 222. In these publications the device as illustrated comprises a ring having one or more projections or "noses" which contact the inner ring of a bearing (the article), the plane of the ring forming an angle no greater than $\tan^{-1} \mu$ with a plane extending perpendicular to the axis of the shaft, $\mu$ being the coefficient of friction between the ring and the shaft.

The device need not be a ring and could be horseshoe shaped for example. For the sake of simplicity, in this specification a ring will be referred to but with the understanding that other shapes are to be included.

In most circumstances the assembly works very well and has merits of simplicity and ease of assembly.

In exceptional circumstances however, such as when blows are applied at one or more locations around the ring, the ring can become dislodged.

The object of the invention is to provide a measure of protection for the element or ring, so that it is protected from being hit, and to simplify manufacture and production of the element or ring.

The invention is characterised in that a cap is provided which includes an annular portion which surrounds the element and a radially inwardly extending flange portion which is positioned between the element and the article.

The element may comprise a ring which has one or more projections or "noses".

Preferably a cover is provided which engages the annular portion of the cap and has a flange portion which extends radially inwardly, the element lying between the flange portions of the cap and the cover. Such a cover will assist in protecting the assembly from the environment, for example stones and grass wrap which are to be found in agricultural applications.

The flange portion of the cover may have a bore to allow the shaft to extend therethrough or may form a closed or blank end.

To withstand impacts that might dislodge the element or ring, the cap may be of plastics but is preferably of metal, but the cover may be of plastics.

Preferably, the cap has one or more projections which extend generally axially away from the article and contact the element.

These projections take the place of projections or noses that would otherwise be provided by the element or ring.

Fitting the ring to the shaft is accomplished by axial force such as one or more blows directed at specified locations to lock it in place. This means that the ring has to be made of a sturdy material such as wrought steel. The production of integral noses complicates the manufacture of the ring. By making the projections or noses on the cap simplifies production of the ring, particularly if the cap is a sheet metal pressing or a moulded plastics component.

Preferably the element and the cap have co-operating formations which prevent rotation of one with respect to the other. If relative rotation were to occur, the projections may dislodge the element.

In one aspect of this feature, the cap has an "external" keyway and the element has an "internal" keyway.

Preferably, the cap has a sealing lip contacting the article, which lip may be inclined. If, for, example, the article is a rolling bearing, with the cap abutting the inner ring, the sealing lip contacts the outer ring, providing additional protection for the bearing from environmental contamination.

The cap with sealing lip is preferably an integral moulded one piece plastics component. However, it may be a multi-part component, the parts being produced separately and which then may be secured together, and the parts may be of dissimilar materials, for example, metal and plastics.

In another aspect, the invention is characterised in that one or more members extend from the element to the article, the or each member having been produced separately from the element and article.

In an embodiment in which the element is a ring, fitting the ring to the shaft is accomplished by an axial force such as one or more blows at specified locations to lock it in place. This means that the ring has to be made of a sturdy material such as wrought steel. The production of integral projections or "noses" complicates the manufacture of the ring. By having separately produced members taking the place of the or each projection, the manufacture and production of the ring is simplified.

Preferably, the or each member is provided by an annular component interposed between the element and the article. Such a component can be relatively easily moulded from plastics or can be made from steel.

Preferably, the annular component and the element have cooperating formations which prevent rotation of one with respect to the other; which formations may be clips on the annular component engaging in recesses in the element.

The or each member may be a pin engaging in a bore in the element. The fit of the pin may be a clearance or interference fit. With a clearance fit, the pin may be secured bY an adhesive or by welding.

Preferably, the or each member is part of a cap which includes an annular portion which surrounds the element and a radially inwardly extending flange portion which is positioned between the element and the article.

Such a cap provides a measure of protection for the element from accidental knocks and blows which may otherwise dislodge the element.

Preferably a cover is provided which engages the annular portion of the cap and has a flange portion which extends radially inwardly, the element lying between the flange portions of the cap and cover.

Such a cover will assist in protecting the assembly from the environment, for example stones and grass wrap which are to be found in agricultural applications.

The flange portion of the cover may have a bore to allow the shaft to extend there through or may form a closed or blank end.

To withstand impacts that might dislodge the element or ring, the cap may be of plastics but is preferably of metal, but the cover may be of plastics.

Preferably, the element and the cap have co-operating formations which prevent rotations of one with respect to the other. This ensures that the element and the cap are correctly aligned in the assembly. When fitting the element or ring, the axial force or blow(s) applied are made at the correct specified location with respect to the projection(s) or nose(s) if the element and cap have only one relative position.

In one aspect of this feature, the cap has an "external" keyway and the element has an "internal" keyway.

Preferably, the cap has a sealing lip contacting the article, which lip may be inclined.

If, for example, the article is a rolling bearing, with the cap abutting the inner ring, the sealing lip contacts the outer ring, providing additional protection for the bearing from environmental contamination.

The cap with sealing lip is preferably an integral, moulded one-piece plastics component. However, it may be a multi-part component, the parts being produced separately and which then may be secured together, and the parts may be of dissimilar materials, for example, metal and plastics.

In the accompanying drawings:

FIG. 4 is an end view of a sheet metal protective cap with integral noses;

FIG. 5 is a section on the cap of FIG. 4 taken on V—V;

FIG. 6 is an end view of a moulded plastics protective cap with an integral nose;

FIG. 7 is a section on the cap of FIG. 6 taken on VII—VII;

FIG. 8 is a side view of the cap of FIG. 6;

FIG. 11 is a section on the assembly of FIG. 13 taken on XIV—XIV;

Figure 1:
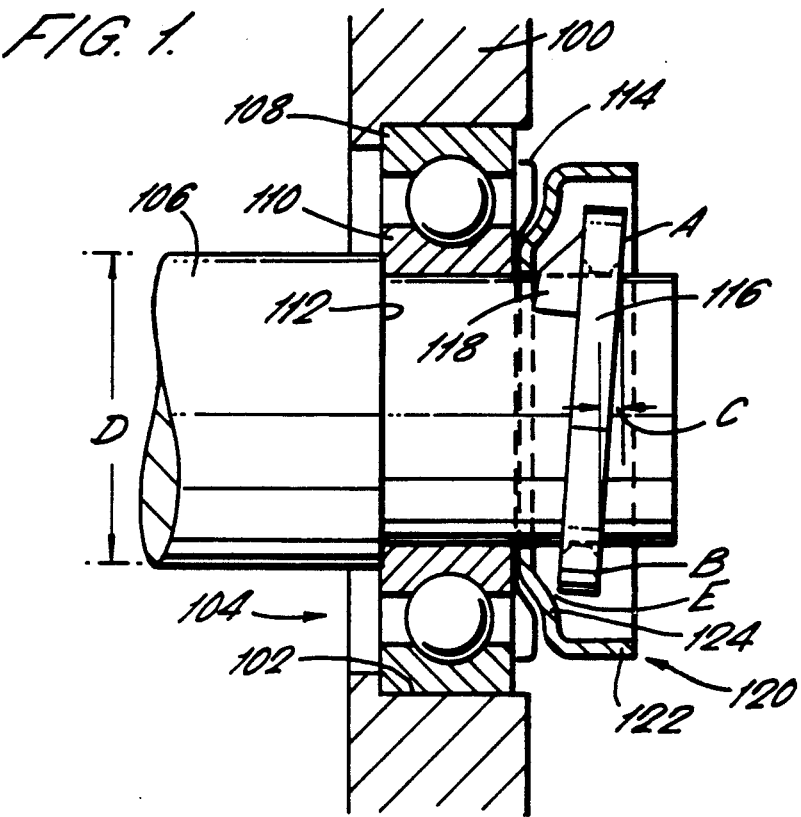
FIG. 1 is a longitudinal section of an assembly of a shaft, a bearing and a locking ring with a protective cap.

Referring to FIG. 1 of the drawings, a housing wall 100 has a stepped bore 102, a bearing 104 is secured in the bore and supports a shaft 106 for rotation with respect to the wall. The bearing 104 is a single-row, deep-groove radial ball bearing having an outer ring 108 fitted in the bore 102 up against the step, and an inner ring 110 which is fitted on the shaft 106 up against a shoulder 112 of the shaft. The bearing 104 is sealed by a seal 114.

In order to prevent relative movement of the bearing 104 with respect to the shaft 106 in the direction away from the shoulder 112, a locking ring 116 is secured to the shaft. The ring 116 has two projections or "noses" 118 which extend towards the inner bearing ring 110 and lie on opposite sides of a vertical plane in which lies the axis of the shaft 106.

A sheet metal cap 120 is mounted on the shaft, which cap comprises an annular portion 122 surrounding the locking ring 116 and a radially inwardly extending flange portion 124 which is positioned betWeen the ring 116 and the inner bearing ring 110. The flange portion 124 is shaped to avoid the outer ring 108 and the seal 114 and at its inner periphery it contacts the inner bearing ring 110. The locking ring 116 is positioned so that its noses contact the inner periphery of the flange portion 124 of the cap 120.

The following is an example of how the locking ring 116 is locked in position on the shaft 106. The locking ring 116 has a bore which is a clearance or push fit on the shaft 106 and has inner bevelled edges. It is manouvered along the shaft until the noses 118 are in contact with the inner periphery of the flange portion 124 of the cap 120 which, in turn, is in contact with the inner bearing ring 110. The region A (12-O-clock) of the noses 118 of the locking ring 116 is held against movement and the region B(6-O-clock)—diametrically opposite—is given a light blow in the direction towards the bearing ring 110. This holds the locking ring 116 in position. Then the locking ring 116 is subject to further larger blows at 6-o-clock, 5-o-clock and 7-o-clock with, for example, a 1 or 2 pound hammer. The dimension C is then measured to see if it is equal to or greater than 0.05x the diameter (D) of the shaft and if not, the further blows are repeated until the condition is reached.

Finally, a check is made to make sure there is a gap at E. The dimensions C and E are greatly enlarged for clarity. The locking ring 116 is thus caused to adopt a position in which the plane of the ring forms an angle with a plane perpendicular to the longitudinal axis of the shaft 106 which is no greater than $\tan^{-1} \mu$, where $\mu$ is the coefficient of friction between the shaft and the ring.

With the locking ring 116 in position and abutting the cap 120 which abuts the bearing 104, the bearing is prevented from moving along the shaft 106 towards the locking ring, and the locking ring is protected from accidental knocks and blows which may dislodge it.

Figure 2:
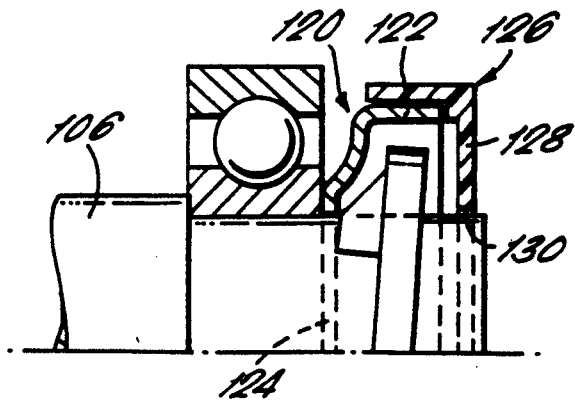
FIGS. 2 and 3 are parts of the section of FIG. 1 showing the cap with two different covers.
Figure 3:
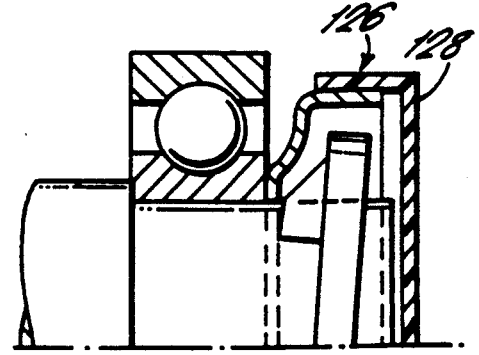

FIGS. 2 and 3 shows the same set up as in FIG. 1 but with the provision of a plastics cover 126 engaging the annular portion 122 of the cap 120. The cover 126 has a flange portion 128 which extends radially inwardly, with the locking ring 116 lying between the flange portions 124 and 128 of the cap 120 and the cover 126. In FIG. 2, the flange portion 128 of the cover 126 has a bore 130 through which the shaft 106 extends, whereas in FIG. 3, the flange portion 128 forms a closed or blank end.

Figure 9:
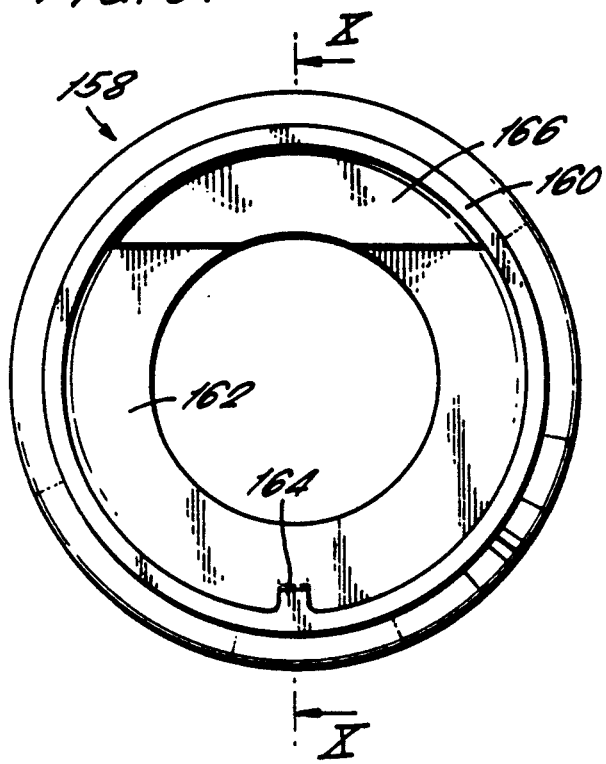
FIG. 9 is an end view of a moulded plastics protective cap with an integral nose and a sealing lip.
Figure 10:
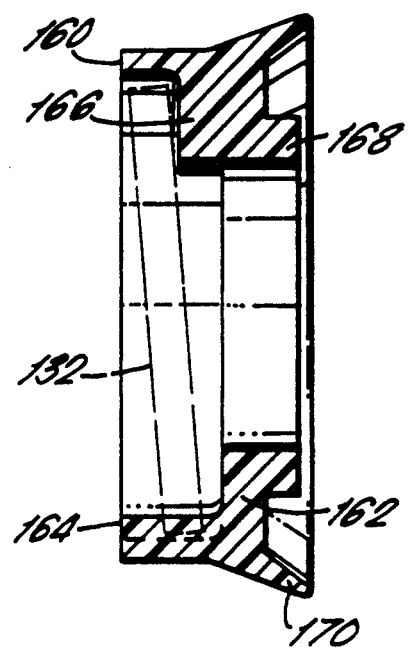
FIG. 10 is a section on the cap of FIG. 9 taken an X—X.

FIGS. 4 and 5 show one construction; FIGS. 6,7,8 show a second construction and FIGS. 9 and 10 show a third construction of a cap suitable for use with the locking ring 132 shown in FIGS. 11 and 12. This locking ring 132 is a plain circular ring with no noses or projections. The ring has an axially extending slot or groove 134 in its radially outer circumferential surface forming an internal keyway and has inner curved bevelled edges 136.

FIGS. 4 and 5 show a cap 138 which is made of sheet metal with an annular outer portion 140 and a radially inwardly extending flange portion 142. The annular portion 140 has a projection 144 punched radially inwardly and forming an external keyway for interengagement with the slot 134 of the locking ring 132 (shown in broken line in FIG. 5). The flange portion 142 has two projections 146 bent back inside from its radially inner periphery. These projections 146 take the place of the projections or noses 118 on the locking ring 116 of FIGS. 1 to 3 so simplifying the manufacture of the locking ring 132.

FIGS. 6 to 8 show a cap 148 moulded out of plastics. The cap 148 has an annular outer portion 150 and a radially inwardly extending flange portion 152. The annular portion 150 has a radially inwardly and longitudinally extending projection 154 on its inner surface forming an external keyway for interengagement with the slot 134 of the locking ring 132 (shown in broken line in FIG. 7). The flange portion 152 has a thicker segment 156 forming a projection extending back inside the cap 148. This projection 156 takes the place of the projections or noses 118 on the locking ring 116 of FIGS. 1 to 3.

FIGS. 9 and 10 show a cap 158 which is a development of the cap 148 of FIGS. 6 to 8. The cap 158 is moulded from plastics and like the cap 148, comprises an annular outer position 160, a flange portion 162, a projection 164 for interengagement with the slot 134 of the locking ring 132 (shown in broken line in FIG. 10) and a projection 166. In addition the cap 158 has an annular projection 168 extending from the radially inner periphery of the flange portion 162 and an annular inclined sealing lip 170 extending from the radially outer periphery of the flange portion 162.

Although not shown, each of the caps 138, 148 and 158 may be used in combination with a cover such as that shown in FIGS. 2 and 3.

Figure 11:
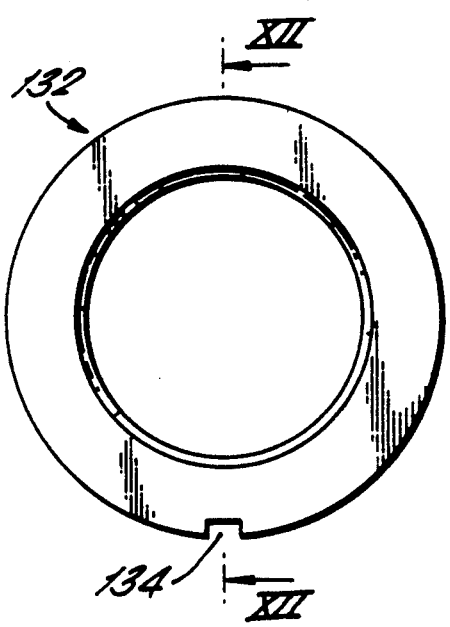
FIG. 11 is an end view of a locking ring for use with the caps of FIGS. 4 to 10.
Figure 12:
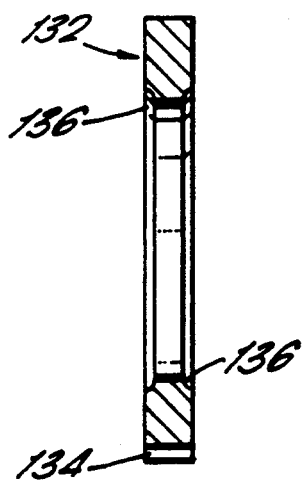
FIG. 12 is a section on the locking ring of FIG. 11 taken on XII—XII.
Figure 13:
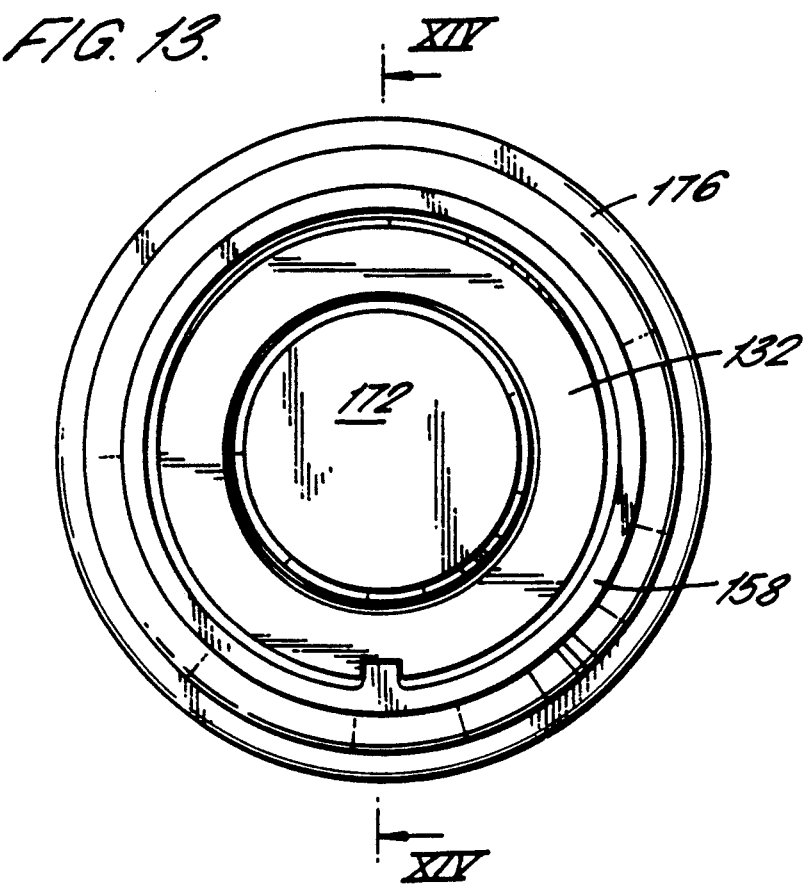
FIG. 13 is an end view of an assembly comprising a stepped shaft, a locking ring as shown in FIGS. 11 and 12, a protective cap as shown in FIGS. 9 and 10 and a ball bearing.
Figure 14:
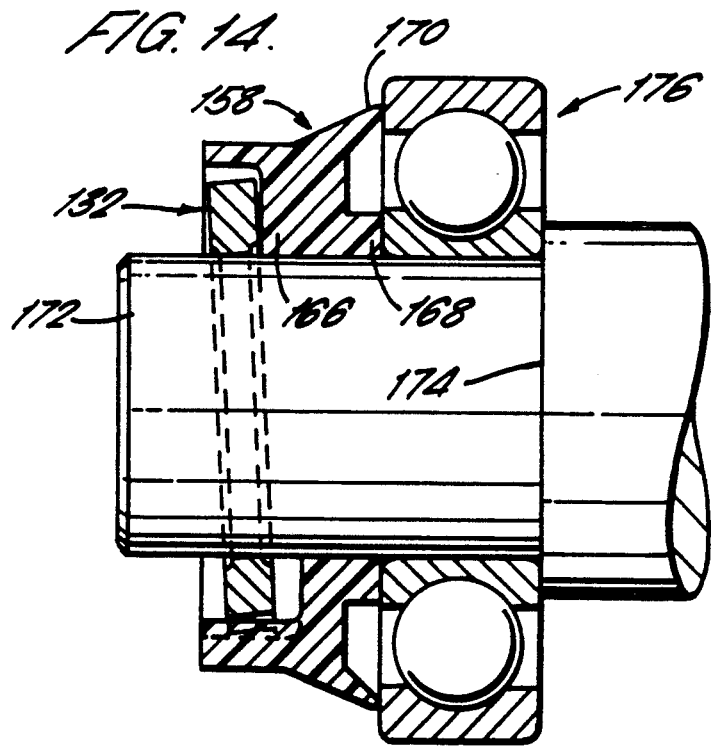

FIGS. 13 and 14 shown an assembly comprising a shaft 172 having a shoulder 174, a radial ball bearing 176 mounted on the smaller diameter portion of the shaft, the cap 158 of FIGS. 9 and 10 and the locking ring 132 of FIGS. 11 and 12. The bearing 176 is mounted with the inner ring butting up against the shoulder 174; the cap 158 is mounted with the projection 168 contacting the inner ring and the lip 170 contacting the outer ring; and the locking ring 132 is arranged inside the annular portion 160 and contacting the projection 166.

Figure 15:
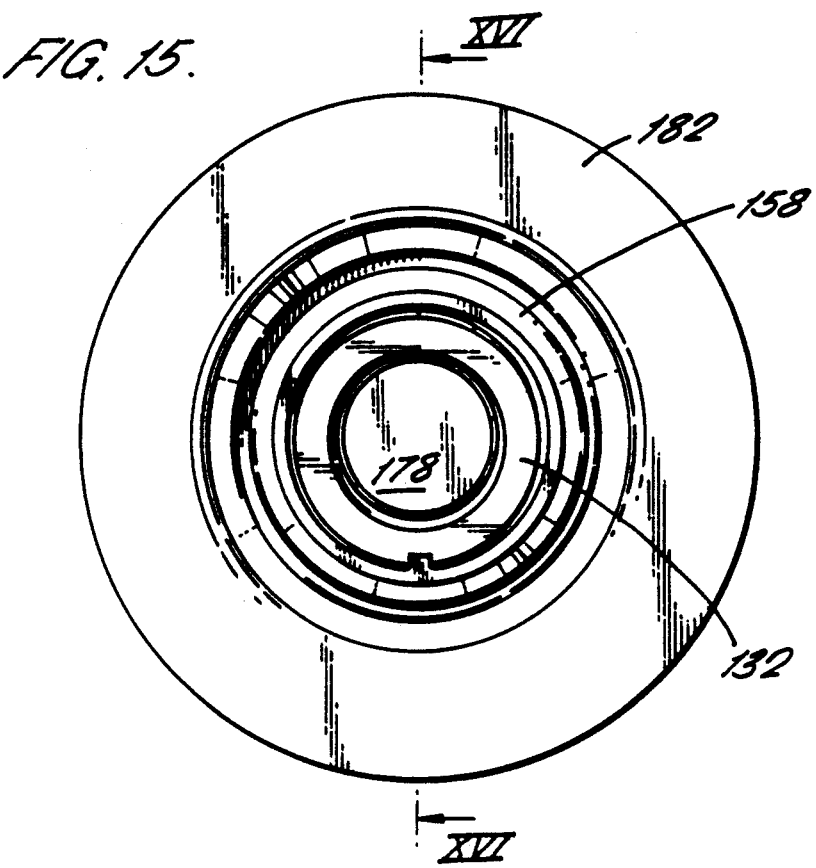
FIG. 15 is an end view of an assembly comprising a shaft, a locking ring as shown in FIGS. 11 and 12, a protective cap as shown in FIGS. 9 and 10 and a ball bearing, with the locking ring, cap and bearing located within the end cap of an idler conveyor roller.
Figure 16:
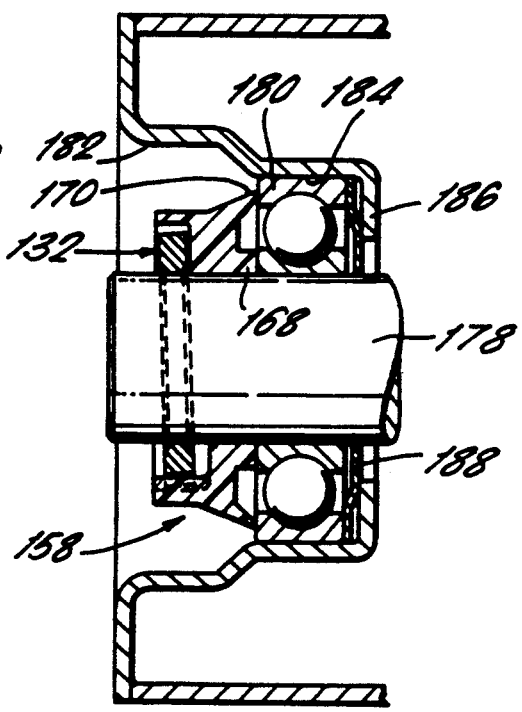
FIG. 16 is a section on the mounting of FIG. 15 taken on XVI—XVI.

FIGS. 15 and 16 show one end of a conveyor roller mounted for rotation on a shaft 178 by means of a ball bearing 180. The roller has an end cap 182 which provides a seating bore 184 for the bearing 180 and leads to a radially inwardly extending flange 186. Between the flange 186 and the bearing 180 there is arranged a seal plate 188. The bearing 180 is prevented from moving in the direction by means towards the cap 158 of FIG. 9 and 10 and the locking ring 132 of FIGS. 11 and 12. The projection 168 of the cap 158 abuts the inner ring of the bearing 180 and the lip 170 is in sealing contact with the outer ring of the bearing.

In the assemblies of FIGS. 13 and 14 and FIGS. 15 and 16, the locking ring 132 can be mounted in position by the same procedure as described for FIG. 1 ensuring that the keyways engage with each other.

Figure 17:
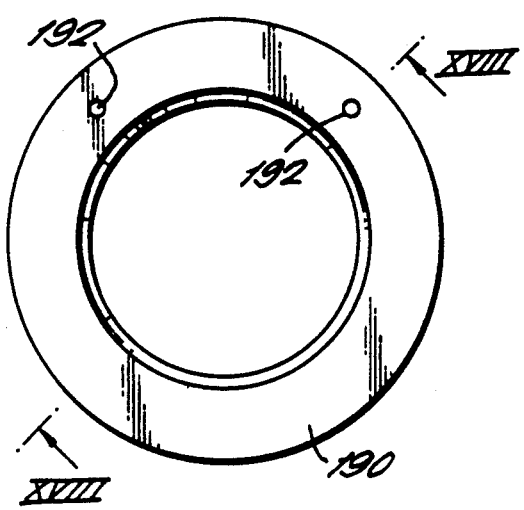
FIG. 17 is an end view of a locking ring having two axially extending apertures.
Figure 18:
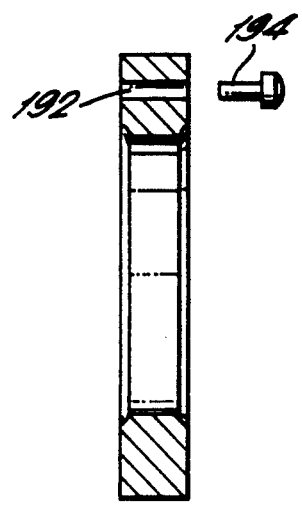
FIG. 18 is a section on the ring of FIG. 17 taken on XVIII—XVIII and showing a stepped pin for fitting in one of the apertures to provide a nose.

FIGS. 17 and 18 show a locking ring 190, which is a plain circular ring with bevelled edges in its bore. As such it is much the same as the locking ring 116 of FIGS. 1, 2, and 3 but without any projections or noses. Instead the ring 190 has two bores 192 and two stepped pins 194 (only one of which is shown) are formed separately from the ring for fitting in the bores. The pins 194 may be of plastics or metal, maybe a loose or tight fit in the bores 192 and may be secured by gluing or welding or left loose. With the pins 194 in place, the ring 190 has the required projections or noses for preventing movement of an article on a shaft.

Figure 19:
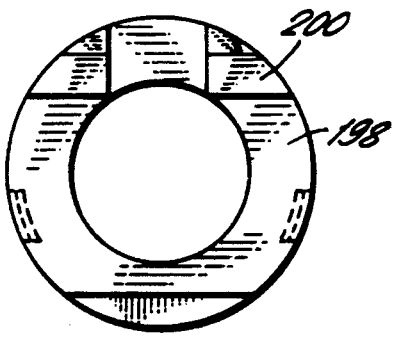
FIG. 19 is an end view of a combination of a locking ring and an annular moulded platics component, which component provides two noses.
Figure 20:
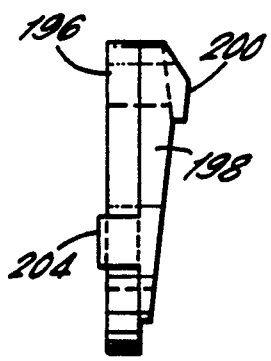
FIG. 20 is a side view of the combination of FIG. 19.
Figure 21:
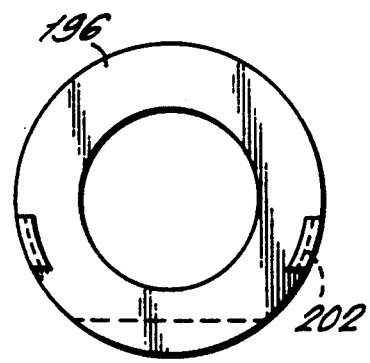
FIG. 21 is a view of the combination of FIG. 19 taken from the opposite end.

FIGS. 19, 20 and 21 show a locking ring 196 in combination with a separately formed annular plastics component 198. The plastics component 198 provides two projections or noses 200. The locking ring 196 has two recesses 202 in its outer periphery, and the annular component 198 has two L-shaped elastically bendable arms 204 which engage in the recesses 202 and hold the component to the ring and prevent their relative rotation.

We claim:

1. An assembly comprising a shaft, an article mounted on the shaft and a device which is also mounted on the shaft and prevents movement of the article along the shaft in the direction of the article to the device, the device comprising an element extending at least part way around the shaft and which, during assembly, can be moved along the shaft and then caused to adopt a position in which the element lies in a first plane extending perpendicular to a second plane in which lies the longitudinal axis of the shaft, the first plane forming an angle with a third plane extending perpendicular to the longitudinal axis of the shaft which is no greater than $\tan^{-1} \mu$, where $\mu$ is the coefficient of friction between the shaft and the element, characterized in that one or more members extend from the element to the article, the or each member having been produced separately from the element and article, the or each member being provided by an annular component interposed between the element and the article.

2. An assembly as claimed in claim 1, wherein the element and the annular component have co-operating formations which prevent rotation of one with respect to the other.

3. An assembly as claimed in claim 1, wherein the annular component is a cap which includes an annular portion which surrounds the element and a radially inwardly extending flange portion which is positioned between the element and the article.

4. An assembly comprising a shaft, an article mounted on the shaft and a device which is also mounted on the shaft and prevents movement of the article along the shaft in the direction from the article to the device, the device comprising an element extending at least part the way round the shaft and which, during assembly, can be moved along the shaft and then caused to adopt a locking position in which the element lies in a first plane extending perpendicular to a second plane in which lies the longitudinal axis of the shaft, the first plane forming an angle with a third plane extending perpendicular to the longitudinal axis of the shaft which is no greater than $\tan^{-1} \mu$, where $\mu$ is the coefficient of friction between the shaft and the element, and a cap having an annular portion circumferentially surrounding the element and a radially inwardly extending portion between the element and the article, said cap protecting the element from being dislodged by engagement from a radial direction.

5. An assembly as claimed in claim 4, wherein the cap has one or more projections which extend generally axially away from the article and contact the element.

6. An assembly as claimed in claim 5, wherein the element and the cap have co-operating formations which prevent rotation of one with respect to the other.

7. An assembly as claimed in claim 4, wherein the cap has a sealing lip contacting the article.

8. An assembly comprising a shaft, an article which is mounted on the shaft and a device which is also mounted on the shaft and prevents movement of the article along the shaft in the direction from the article to the device, the device comprising an element extending at least part the way round the shaft and which, during assembly, can be moved along the shaft and then caused to adopt a position in which it lies in a first plane extending perpendicular to a second plane in which lies the longitudinal axis of the shaft, the first plane forming an angle with a third plane extending perpendicular to the longitudinal axis of the shaft which is no greater than $\tan^{-1} \mu$, where $\mu$ is the coefficient of friction between the shaft and the element, characterized in that a cap is provided which includes an annular portion which surround the element and a radially inwardly extending flange portion which is positioned between the element and the article, and a cover engaging the annular portion of the cap and having a flange portion which extends radially inwardly, the element lying between the flange portions of the cap and the cover.

9. An assembly as claimed in claim 8, wherein the cover has a bore through which the shaft extends.

10. As assembly comprising a shaft, an article mounted on the shaft and a device which is also mounted on the shaft and prevent movement of the article along the shaft in the direction of the article to the device, the device comprising an element extending at least part the way round the shaft and which, during assembly, can be moved along the shaft and then caused to adopt a position in which lies in a first plane extending perpendicular to a second plane in which lies the longitudinal axis of the shaft, the first plane forming an angle with a third plane extending perpendicular to the longitudinal axis of the shaft which is no greater than $\tan^{-1} \mu$, where $\mu$ is the coefficient of friction between the shaft and the element, characterized in that one or more members extend from the element to the article, the or each member having been produced separately from the element and article, the or each member being part of a cap which includes an annular portion surrounding the element and a radially inwardly extending flange portion positioned between the element and the article and a cover engaging the annular portion of the cap and having a flange portion which extends radially inwardly, the element lying between the flange portions of the cap and cover.

11. An assembly as claimed in claim 10, wherein the or each member is a pin engaging in a bore in the element.

12. An assembly as claimed in claim 10, wherein the cover has a bore through which the shaft extends.

13. An assembly as claimed in claim 10, where the element and the cap have co-operating formations which prevent rotation of one with respect to the other.

14. An assembly as claimed in claim 10, wherein the cap has a sealing lip contacting the article.

* * * * *